(12) United States Patent
Dams et al.

(10) Patent No.: US 7,803,894 B2
(45) Date of Patent: Sep. 28, 2010

(54) COATING COMPOSITIONS WITH PERFLUOROPOLYETHERISOCYANATE DERIVED SILANE AND ALKOXYSILANES

(75) Inventors: Rudolf J. Dams, Antwerp (BE); Steven J. Martin, Shoreview, MN (US)

(73) Assignee: 3M Innovatie Properties Company, St. Paul, MN (US)

( * ) Notice: Subject to any disclaimer, the term of this patent is extended or adjusted under 35 U.S.C. 154(b) by 699 days.

(21) Appl. No.: 10/729,073

(22) Filed: Dec. 5, 2003

(65) Prior Publication Data

US 2005/0121644 A1 Jun. 9, 2005

(51) Int. Cl.
*C08G 77/14* (2006.01)
*C08G 77/18* (2006.01)
*C08G 77/04* (2006.01)
*C08G 18/50* (2006.01)
*C08G 18/71* (2006.01)

(52) U.S. Cl. .......................... 528/26; 525/452; 525/453; 525/460; 528/28; 528/29

(58) Field of Classification Search .................... 528/26, 528/28, 29; 525/452, 453, 460
See application file for complete search history.

(56) References Cited

U.S. PATENT DOCUMENTS

| | | |
|---|---|---|
| 2,567,011 A | 9/1951 | Diesslin et al. |
| 3,250,808 A | 5/1966 | Moore, Jr. et al. |
| 3,271,341 A | 9/1966 | Garrison, Jr. |
| 3,274,244 A | 9/1966 | Mackenzie |
| 3,472,894 A | 10/1969 | Bartlett |
| 3,505,229 A | 4/1970 | Skehan |
| 3,536,710 A | 10/1970 | Bartlett |
| 3,555,089 A | 1/1971 | Bartlett |
| 3,574,770 A | 4/1971 | Paine |
| 3,621,059 A | 11/1971 | Bartlett |
| 3,644,492 A | 2/1972 | Bartlett |
| 3,646,085 A | 2/1972 | Bartlett |
| 3,683,027 A | 8/1972 | Sainesi et al. |
| 3,772,195 A | 11/1973 | Francen |
| 3,787,351 A | 1/1974 | Olson |
| 3,798,265 A | 3/1974 | Bartlett |
| 3,810,874 A | 5/1974 | Mitsch |
| 3,814,741 A | 6/1974 | Caporiccio et al. |
| 3,839,425 A | 10/1974 | Bartlett |
| 3,944,610 A | 3/1976 | Caporiccio et al. |
| 3,950,588 A | 4/1976 | McDougal |
| 4,090,967 A | 5/1978 | Falk |
| 4,099,574 A | 7/1978 | Cooper et al. |
| 4,242,516 A | 12/1980 | Mueller |
| 4,359,096 A | 11/1982 | Berger |
| 4,383,929 A | 5/1983 | Bertocchio et al. |
| 4,472,286 A | 9/1984 | Falk |
| 4,536,298 A | 8/1985 | Kamei et al. |
| 4,647,413 A | 3/1987 | Savu |
| 4,668,406 A | 5/1987 | Chang |
| 4,687,707 A | 8/1987 | Matsuo et al. |
| 4,795,764 A | 1/1989 | Alm et al. |
| 4,923,720 A | 5/1990 | Lee et al. |
| 4,975,502 A | 12/1990 | Morita et al. |
| 4,983,769 A | 1/1991 | Bertocchio et al. |
| 5,022,713 A | 6/1991 | Pugh et al. |
| 5,027,742 A | 7/1991 | Lee et al. |
| 5,066,522 A | 11/1991 | Cole et al. |
| 5,085,786 A | 2/1992 | Alm et al. |
| 5,108,799 A | 4/1992 | Hoy et al. |
| 5,130,477 A | 7/1992 | Koike et al. |
| 5,132,455 A | 7/1992 | Lagow |
| 5,211,342 A | 5/1993 | Hoy et al. |
| 5,274,159 A | 12/1993 | Pellerite et al. |
| 5,294,248 A | 3/1994 | Chittofrati et al. |
| 5,306,758 A | 4/1994 | Pellerite |
| 5,352,752 A | 10/1994 | Koike et al. |
| 5,424,438 A | 6/1995 | Chittofrati et al. |
| 5,698,138 A | 12/1997 | Visca et al. |
| 5,705,591 A | 1/1998 | Matsuda et al. |
| 5,739,369 A | 4/1998 | Matsumura et al. |
| 5,851,674 A | 12/1998 | Pellerite et al. |
| 5,863,612 A | 1/1999 | DeSimone |
| 5,910,557 A | 6/1999 | Audenaert et al. |
| 5,919,886 A | 7/1999 | Matsuda et al. |

(Continued)

FOREIGN PATENT DOCUMENTS

EP 0 250 767 9/1991

(Continued)

OTHER PUBLICATIONS

Milton J. Rosen, "Surfactants and Interfacial Phenomena," Second Ed., John Wiley & Sons, New York, NY, 1989, p. 1.

(Continued)

*Primary Examiner*—Rabon Sergent
(74) *Attorney, Agent, or Firm*—Kathleen B. Gross; Brian E. Szymanski; Robert H. Jordan

(57) ABSTRACT

Described are coating compositions for treating substrates such as hard and soft surfaces to render the surfaces oil and water repellent, as well as stain and dirt resistant. The compositions described include three component systems in an organic solvent, where the components include a hydrolyzable perfluoropolyetherisocyanate derived silane, and to non-fluorinated components such as alkoxy silanes, one optionally containing a reactive functional group.

18 Claims, No Drawings

U.S. PATENT DOCUMENTS

| | | | |
|---|---|---|---|
| 5,922,787 | A | 7/1999 | Kondo et al. |
| 5,922,833 | A | 7/1999 | DeSimone |
| 6,030,663 | A | 2/2000 | McClain et al. |
| 6,127,000 | A | 10/2000 | Carbonell et al. |
| 6,160,161 | A | 12/2000 | Trabelsi et al. |
| 6,200,884 | B1 | 3/2001 | Yang et al. |
| 6,218,499 | B1 | 4/2001 | Tarumi et al. |
| 6,287,640 | B1 | 9/2001 | McClain et al. |
| 6,288,157 | B1 | 9/2001 | Jariwala et al. |
| 6,395,848 | B1 | 5/2002 | Morgan et al. |
| 6,429,258 | B1 | 8/2002 | Morgan et al. |
| 6,495,624 | B1 | 12/2002 | Brown |
| 6,525,127 | B1 | 2/2003 | Jariwala et al. |
| 6,592,659 | B1 | 7/2003 | Terrazas et al. |
| 6,613,860 | B1 | 9/2003 | Dams et al. |
| 6,649,272 | B2 | 11/2003 | Moore et al. |
| 7,652,115 | B2 * | 1/2010 | Dams et al. .................. 528/26 |
| 2002/0016267 | A1 | 2/2002 | Scicchitano et al. |
| 2002/0192380 | A1 | 12/2002 | Elsbernd et al. |
| 2003/0113555 | A1 | 6/2003 | Pellerite et al. |
| 2003/0124361 | A1 | 7/2003 | Moore et al. |
| 2003/0138643 | A1 | 7/2003 | Moore et al. |
| 2003/0139521 | A1 | 7/2003 | Linert et al. |
| 2003/0161962 | A1 | 8/2003 | Lines et al. |
| 2003/0181572 | A1 | 9/2003 | Tan et al. |

FOREIGN PATENT DOCUMENTS

| | | |
|---|---|---|
| EP | 0 219 065 | 3/1992 |
| EP | 0 273 449 | 3/1992 |
| EP | 0 615 779 | 2/1994 |
| EP | 0 625 526 | 11/1994 |
| EP | 0 770 634 | 5/1997 |
| EP | 0 789 050 | 8/1997 |
| EP | 0 797 111 | 9/1997 |
| EP | 0 870 778 | 10/1998 |
| EP | 1 006 168 | 6/2000 |
| EP | 1 038 919 | 9/2000 |
| EP | 0 853 638 | 4/2001 |
| EP | 1 329 548 | 7/2003 |
| JP | 57-70112 | 4/1982 |
| JP | 62-238867 | 10/1987 |
| JP | 4-146917 | 5/1992 |
| JP | 10-81873 | 3/1998 |
| WO | 97/44300 | 11/1997 |
| WO | WO 97/45167 | 12/1997 |
| WO | WO 98/40439 | 9/1998 |
| WO | WO 99/03941 | 1/1999 |
| WO | WO 99/19080 | 4/1999 |
| WO | WO 99/33927 * | 7/1999 |
| WO | WO 99/37720 | 7/1999 |
| WO | WO 00/27544 | 5/2000 |
| WO | WO 00/56450 | 9/2000 |
| WO | WO 01/30873 | 5/2001 |
| WO | WO 01/34670 A1 | 5/2001 |
| WO | WO 01/94446 | 12/2001 |
| WO | WO 02/30848 | 4/2002 |
| WO | WO 02/095121 | 11/2002 |
| WO | WO 03/040209 | 5/2003 |
| WO | WO 03/040209 A1 | 5/2003 |
| WO | WO 03/040247 | 5/2003 |
| WO | 03/099904 | 12/2003 |

OTHER PUBLICATIONS

Milton J. Rosen, "Surfactants and Interfacial Phenomena," Second Ed., John Wiley & Sons, New York, NY, 1989, pp. 3-4.

Fluorinated Surfactants and Repellents, Second Edition, by E. Kissa, Surfactant Science Series, vol. 97, Marcel Dekker, Inc.: New York, 2001, pp. 1-21.

Encyclopedia of Chemical Technology, 4$^{th}$ Edition, "Supercritical Fluids", N.Y., John Wiley and Sons, vol. 23, pp. 452-477.

K.A. Nielsen, J.N. Argyropoulos, D.C. Busby, D.J. Dickson, C.S. Lee, "Enhanced Performance and Improved Economics of Supercritical Fluid Applied Coatings", pp. 151-160, Feb. 22-24, 1995, Waterborne, High-Solids, and Powder Coatings Symposium.

W.C.Bunyard, F.E. Henon, S.N. Burns, R.W. Linton, R.G. Carbonell, J.M. DeSimone, "Synthesis of Novel Perfluoropolyethers for Carbon Dioxide-Based Coatings Technologies", University of North Carolina, Dept. of Chemistry, pp. 1-10, May 2007.

J. Lewis, J.N. Argyropoulos, K.A. Nielson, "Supercritical Carbon Dioxide Spray Systems", Metal Fininshing, Apr. 1997.

Annual Book of ASTM Standards, 2003, ASTM D-1331, entitled Standard Test Methods for Surface and Interfacial Tension of Solutions of Surface-Active Agents, pp. 83-85.

Test method 22-1996, published in the 2001 Technical Manual of the American Association of Textile Chemists and Colorists (AATCC), entitled "Water Repellency: Spray Test", vol. 72, 1997, pp. 62-64.

American Association of Textile Chemists and Colorists (AATCC) Standard Test Method No. 118-1983, vol. 59, 1984, entitled "Oil Repellency: Hydrocarbon Resistance Test", p. 274.

Annual Book of ASTM Standards, Part 23, 1970, ASTM D 1141-52, entitled "Standard Specifications for Substitute Ocean Water", pp. 207-209.

* cited by examiner

US 7,803,894 B2

COATING COMPOSITIONS WITH PERFLUOROPOLYETHERISOCYANATE DERIVED SILANE AND ALKOXYSILANES

FIELD OF THE INVENTION

The present invention relates to coating compositions and methods for treating substrates such as hard and soft surfaces, to render these surfaces oil and water repellant as well as stain and dirt resistant.

BACKGROUND OF THE INVENTION

Certain coating compositions containing monofunctional polyether silanes and alkoxysilanes have been described in, for example, U.S. Pat. No. 4,687,707; WO 99/03941; U.S. Pat. No. 5,739,369; U.S. Pat. No. 5,919,886; U.S. Pat. No. 5,306,758; and U.S. Pat. No. 5,922,787. In addition, coating compositions containing difunctional perfluoropolyethersilanes and alkoxysilanes are described in WO 03/040247 and WO 03/040209. More recently, coating compositions containing mono- and difunctional perfluoropolyether isocyanate derived silanes have been described in U.S. application Ser. No. 10/657,644. Despite the many fluorinated silane compositions known in the art, there still remains a need to provide improved compositions for the treatment of substrates, having hard and soft surfaces. Desired improvement in properties such as oil and water resistance as well as stain, dirt and dust resistance is needed on hard surfaces, for example, on ceramics, glass, stone, plastics or metals. These improved properties are desired also on soft surfaces such as textiles, carpet, leather and the like. There remains a particular need to improve the durability of the coatings including improved mechanical abrasion resistance. Also, it is desired that the coating show excellent chemical resistance, especially when exposed to alkaline or acidic products. Furthermore, improving the ease of cleaning of such substrates while using less detergents, water or manual labor, is not only desired by the end consumer, but has also a positive impact on the environment. In addition, selecting compositions without ecologically objectionable components is highly desirable.

SUMMARY OF THE INVENTION

The present invention provides novel coating compositions which include mono and difunctional perfluoropolyether isocyanate derived silanes and alkoxy silanes which provide improved water and oil repellency as well as stain and dirt resistance on substrates with excellent mechanical abrasion resistance and chemical stability, particularly with regard to alkaline products.

Accordingly, one aspect of the present invention is a composition which includes a mixture of (a) a hydrolyzable perfluoropolyetherisocyanate derived silane or a mixture thereof comprising the reaction product of: (i) a fluorinated polyether compound of the formula

$$(T'_{k'}\text{-}Q')_y\text{---}R_f\text{-}Q\text{-}T_k \qquad (I)$$

wherein $R_f$ is a monovalent or divalent polyfluoropolyether group; Q and Q' are independently a chemical bond, a divalent organic linking group or a trivalent organic linking group; T and T' each independently represent —NCO or an isocyanate reactive group; k' is an integer from 0 to about 10; k is an integer from 1 to about 10; and y is 0 or 1; and (ii) a silane compound of the formula

$$T''\text{-}Q''\text{-}SiY_{3-x}R_x \qquad (II)$$

wherein T" is —NCO or an isocyanate reactive group; Q" is an organic divalent linking group; R is an alkyl group of 1-4 carbon atoms; Y is a hydrolyzable group; and x is 0, 1 or 2; and wherein at least one of T, T' or T" is —NCO; (b) at least one non-fluorinated compound of an element M from groups III to V of the Periodic Table and having at least two hydrolysable groups; and (c) at least one non-fluorinated compound of an element M from groups III to V of the Periodic Table having two or three hydrolysable groups; a $C_3$-$C_{20}$ hydrocarbon group, a reactive functional group or a mixture thereof. The above composition may further contain (d) an organic solvent.

In a further aspect, the present invention provides a composition derivable from a partial condensation of the above defined composition. By "partial condensation" and "partial condensate" in connection with the present invention is meant that some of the hydrolysable groups in the mixture have reacted while leaving a substantial amount of hydrolysable groups available for a condensation reaction. Typically, a partial condensate means that at least 20%, preferably at least 30%, more preferably at least 50% of the hydrolysable groups are still available for condensation reaction.

In another aspect, the present invention provides a composition derivable from a complete condensation of the above defined composition. By "complete condensation" in connection with the present invention is meant that most or all of the hydrolyzable groups in the mixture have reacted. Typically, a complete condensate means that little or no hydrolyzable groups remain available for condensation reaction.

In another aspect, the present invention provides a process for preparing a partial or complete condensate containing the above defined composition by reacting the components of the composition in an organic solvent in the presence of water and a catalyst, such as an acid or a base.

In a still further aspect, the present invention also provides a method for treating a substrate, comprising the step of applying to at least a portion of the surface of the substrate the compositions as defined above. Preferably, the obtained coating on the substrate is cured, generally at a temperature of about 20° to 300° C., depending on the curing catalyst chosen. The substrate may be pre-heated as to cause curing of the composition when applied, or alternatively the heating may take place simultaneously with or subsequent to the application of the composition onto the substrate. The fluorochemical compositions of the present invention can be used to treat substrates and are capable of rendering such substrates oil and water repellent and/or to provide stain repellency thereto. The compositions are also useful on soft substrates, such as textiles, carpet, leather, marmoleum, vinyl and the like.

Advantageously, the compositions of the invention are prepared by diluting a concentrated solution of the above defined composition. For example, a concentrated solution of at least 10% by weight of a fluorinated polyether isocyanate derived silane and alkoxysilane in an organic solvent is diluted by adding to said solution additional organic solvent(s) so as to prepare a solution containing between 0.01 and 5.0% by weight of the fluorinated polyether isocyanate derived silane.

It has been found that when a composition as defined above is applied from a solution containing an organic solvent, oil and water repellent coatings can be obtained that have excellent abrasion and chemical resistance and very good easy-to-clean properties, in particular when exposed to various cleaning compositions with a pH greater than 9. Furthermore, the compositions spread well on the substrate to be treated with the result that uniform properties can be achieved over the whole surface of the treated substrate.

By the term 'solution' in connection with the present invention is meant that the composition is stable, i.e. no precipitation occurs, for at least the amount of time necessary to prepare the composition and to apply it to the substrate. Generally, this means that the composition should be stable for at least one hour. Compositions of the invention were found to have generally a stability of about 1 day or even longer.

The term "isocyanate reactive group" is defined as a functional group that will react with an isocyanate group. Though not intended to be limiting, some examples of isocyanate reactive groups are: (i) alcohols, to yield urethanes, (ii) amines to yield ureas, (iii) thiols to yield thiocarbamates and (iv) carboxylic acids to yield carboxylic anhydrides or amides and the like. Particularly useful as isocyanate reactive groups are, for example, —$CO_2R^3$, where $R^3$ is hydrogen or hydroxyalkyl, —$C(O)N(R^1)(R^2)$, where $R^1$ and $R^2$ are independently hydrogen, hydroxyalkyl or polyalkylenepolyamine; —OH, —SH, and NHR', where R' is as defined above.

The term "hydrolysable group" in connection with the present invention refers to a group which either is directly capable of undergoing condensation reactions under appropriate conditions or which is capable of hydrolyzing under appropriate conditions, thereby yielding a compound, which is capable of undergoing condensation reactions. Appropriate conditions include acidic or basic aqueous conditions, optionally in the presence of a condensation catalyst.

Accordingly, the term "non-hydrolysable group" as used in the present invention refers to a group not capable of either directly undergoing condensation reactions under appropriate conditions or of hydrolyzing under the conditions listed above for hydrolyzing the hydrolyzable groups.

DETAILED DESCRIPTION OF ILLUSTRATIVE EMBODIMENTS OF THE INVENTION

The coating composition of the present invention is a mixture, partial condensate or complete condensate of three components in an organic solvent.

The first component, component (a), is at least one hydrolyzable perfluoropolyether isocyanate derived silane being the reaction product of a:

(i) a fluorinated polyether compound of the formula

  (I)

and (ii) a silane compound of the formula

T''-Q''-SiY$_{3-x}$R$_x$  (II)

Component (b) is at least one non-fluorinated compound of an element M from groups III-V of the Periodic Table and having at least two hydrolyzable groups;

Component (c) is at least one non-fluorinated compound of an element M from groups III-V of the Periodic Table having two or three hydrolyzable groups; a $C_3$-$C_{20}$ hydrocarbon group, or a reactive functional group.

In component (a), formula I, the monovalent or divalent polyfluoropolyether group $R_f$ in the above formula I can include linear, branched, and/or cyclic structures, that may be saturated or unsaturated. It is a perfluorinated group (i.e., all C—H bonds are replaced by C—F bonds). In one embodiment, the perfluorinated polyether group corresponds to the formula

  (III)

wherein $R_f^1$ is a perfluorinated alkyl or a perfluorinated alkylene group, $R_f^2$ is a perfluorinated polyalkyleneoxy group consisting of perfluorinated alkyleneoxy groups having 1, 2, 3 or 4 carbon atoms or a mixture of such perfluorinated alkyleneoxy groups; $R_f^3$ is a perfluorinated alkylene group or a substituted perfluorinated alkyl group; q and q' are independently chosen from 0 or 1; z is from 4 to 30, and z' is from 0 to 30. The perfluorinated alkyl or alkylene group $R^1_f$ in formula (III) may be linear, branched or cyclic and may contain catenary heteroatoms, such as N, O or S, and may contain 1 to 10 carbon atoms, preferably 1 to 6 carbon atoms. $R^2_f$ and $R^3_f$ are perfluorinated repeating units and combinations thereof. For example, $R^3_f$ is —$(C_nF_{2n})$— or —(CF(Z))—. $R^2_f$, for example, includes perfluorinated repeating units such as —$(C_nF_{2n}O)$—, —(CF(Z)O)—, —$(CF(Z)C_nF_{2n}O)$—, —$(C_nF_{2n}CF(Z)O)$—, —$(CF_2CF(Z)O)$—, and combinations thereof. In these repeating units Z is a fluorine atom, a perfluoroalkyl group, a substituted perfluoroalkyl group, an oxygen-substituted perfluoroalkyl group, a perfluoroalkoxy group, or an oxygen-substituted perfluoroalkoxy group, all of which can be linear, branched, or cyclic, and preferably have about 1 to about 9 carbon atoms and 0 to about 4 oxygen atoms. Examples of polyfluoropolyethers containing polymeric moieties made of these repeating units are disclosed in U.S. Pat. No. 5,306,758.

Typical approximate average structures for a divalent perfluoropolyether group include —$CF_2O(CF_2O)_m(C_2F_4O)_pCF_2$—, wherein an average value for m and p is 0 to 50, with the proviso that m and p are not simultaneously 0, —$CF(CF_3)O(CF(CF_3)CF_2O)_pCF(CF_3)$—, —$CF_2O(C_2F_4O)_pCF_2$—, and —$(CF_2)_3O(C_4F_8O)_p(CF_2)_3$—, wherein an average value for p is 3 to 50. Of these, particularly preferred approximate average structures are —$CF_2O(CF_2O)_m(C_2F_4O)_pCF_2$—, —$CF_2O(C_2F_4O)_pCF_2$—, and —$CF(CF_3)(OCF_2(CF_3)CF)_pO(CF_2)_mO(CF(CF_3)CF_2O)_pCF(CF_3)$—.

Typical approximate average structures for a monovalent perfluoropolyether group, $R_f$, include $CF_3CF_2O(CF_2O)_m(C_2F_4O)_pCF_2$—, $CF_3CF_2O(C_2F_4O)_pCF_2$—, $CF_3CF_2CF_2O(CF(CF_3)CF_2O)_pCF(CF_3)$—, or combinations thereof, where an average value for m and p is 0 to 50 and m and p are not independently 0.

As synthesized, these compounds typically include a mixture of polymers. The approximate average structure is the approximate average of the mixture of polymers.

Examples of linking groups Q, Q' and/or Q'' include organic groups that comprise aromatic or aliphatic groups that may be interrupted by O, N or S and that may be substituted, alkylene groups, oxy groups, thio groups, and/or carbonyl groups. Q and Q' are each independently a chemical bond or an organic divalent or trivalent linking group for example as mentioned above. In compounds of formula I, k is at least 1, T and T' are as mentioned above and each T or T' may be independently chosen, and y is 0 or 1. In accordance with a particular embodiment, the moiety -T or -T' is a moiety of the formula —CO—$N(R^1)(R^2)$ where R' is for example —$CH_2CH_2OH$, —$CH_2CH_2NHCH_2CH_2NH_2$ or —$CH_2CH_2NHCH_2CH_2NHCH_2CH_2NH_2$; and $R^2$ is for example hydrogen or $R^1$.

In the above formula II, T'' is a group as defined for T above. In one embodiment T'' includes at least one —NCO group. When T'' is not —NCO, then T includes at least one —NCO group.

The divalent linking group Q'' in the above formula (II) can include linear, branched, or cyclic structures, that may be saturated or unsaturated. The group Q'' can contain one or more heteroatoms (e.g., oxygen, nitrogen, or sulfur) or functional groups (e.g., carbonyl, amido, urethanylene or sulfonamido). It can also be substituted with halogen atoms, preferably, fluorine atoms, although this is less desirable, as this might lead to instability of the compound. Preferably, the divalent linking group Q" is a hydrocarbon group, preferably, a linear hydrocarbon group, optionally containing heteroatoms or functional groups. Examples of Q" groups include —CH$_2$O(CH$_2$)$_3$—, —CH$_2$OC(O)N(R)(CH$_2$)$_3$—, wherein R is H or lower alkyl group, —(C$_n$H$_{2n}$)—N(H)—C(O)O— and —(C$_n$H$_{2n}$)—, wherein n is about 2 to about 6. A preferred linking group Q" is —CH$_2$CH$_2$CH$_2$—.

Y represents a hydrolyzable group in formula (II) such as for example a halide, a C$_1$-C$_4$ alkoxy group, an acyloxy group or a polyoxyalkylene group, such as polyoxyethylene groups as disclosed in U.S. Pat. No. 5,274,159. Specific examples of hydrolysable groups include methoxy, ethoxy and propoxy groups. R independently represents a C$_1$-C$_4$ alkyl group, such as, for example, methyl and ethyl groups.

Compounds of formula I suitable for compositions for treating substrates of the present invention have an average molecular weight (weight average) of at least about 200, and preferably, at least about 800. Preferably, they are no greater than about 10000.

The values of m and p illustrated above for the isocyanate derived fluorinated silanes can vary. Typically, an average value of m is within a range of about 1 to about 50, and an average value of p is within a range of about 4 to about 40. As these are oligomeric or polymeric materials, such compounds exist as mixtures upon synthesis, which are suitable for use. These mixtures may also contain perfluoropolyether chains bearing no functional groups (inert fluids) or more than two terminal groups (branched structures) as a consequence of the methods used in their synthesis. Typically, mixtures of oligomeric or polymeric materials containing less than about 10% by weight of nonfunctionalized polymers (e.g., those without urethane silane groups) can be used. Furthermore, mixtures of any of the individually listed compounds of formula I can be used.

As a specific example, the isocyanate component for making the fluorinated compound of the fluorochemical composition is of the formula (O)CN-Q"-SiY$_{3-x}$R$^1$$_x$ as defined above or (T'$_k$-Q')$_y$—R$_f$Q-T$_k$ as defined above where T includes one to three isocyanate, (O)CN, groups.

The isocyanate compound may be aliphatic or aromatic and is conveniently a non-fluorinated compound. Generally, the molecular weight of the polyisocyanate compound will be not more than 1500 g/mol. Examples include, e.g., stearylisocyanate, phenylisocyanate, hexamethylenediisocyanate, 2,2,4-trimethyl-1,6-hexamethylenediisocyanate, isophoronediisocyanate, 1,2-ethylenediisocyanate, dicyclohexylmethane-4,4'-diisocyanate, cyclic trimer of hexamethylenediisocyanate and cyclic trimer of isophorone diisocyanate (isocyanurates); aromatic polyisocyanate such as 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate. Still further isocyanates that can be used for preparing the fluorinated compound include cyclic diisocyanates such as isophorone diisocyanate (IPDI). Also useful are isocyanates containing internal isocyanate-derived moieties such as azetedinedione-containing diisocyanates such as that available from Bayer as DESMODUR™ TT. Also, other di- or tri-isocyanates such as those available from Bayer as DESMODUR™ L, DESMODUR™ N, and DESMODUR™ W, tri-(4-isocyanatophenyl)-methane (available from Bayer as DESMODUR™ R) and DDI 1410 (available from Henkel) are suitable. The diisocyanates can be condensed first with the fluorinated moiety (for example, polyether dialcohols) or with the appropriate alkoxy silane (for example, aminoalkylalkoxysilanes, such as aminopropyltrimethoxysilane or aminopropyltriethoxysilane, or mercaptoalkylsilanes, such as mercaptopropyltriethoxysilane).

The perfluoropolyether isocyanate derived silanes can be prepared using standard techniques. Generally, one or more compounds of formula I are reacted with one or more compounds of formula II. For example, commercially available or readily synthesized perfluoropolyether diols can be combined with an isocyanate alkoxysilane, such as 3-(triethoxysilyl)propyl isocyanate, commercially available from Aldrich Chemicals, Milwaukee, Wis., by known methods, which are described in the Examples. Such materials may or may not need to be purified before use in a treatment composition.

Alternatively the perfluoropolyether isocyanate derived silanes can be synthesized by first reacting one or more compounds of formula I with a polyfunctional isocyanate, followed by condensation of the residual isocyanate groups with reagents containing a silane functionality, for example aminopropyltriethoxysilane or mercaptopropyltriethoxysilane.

Compounds according to formula (I) can for example be obtained by oligomerization of hexafluoropropylene oxide which results in a perfluoropolyether carbonyl fluoride. This carbonyl fluoride may be converted into an acid, acid salt, ester, amide or alcohol by reactions well known to those skilled in the art. The carbonyl fluoride or acid, ester or alcohol derived therefrom may then be reacted further to introduce the desired reactive groups according to known procedures. For example, EP 870 778 describes suitable methods to produce compounds according to formula (I) having desired moieties -Q-T$_k$. Compounds having the moiety —CON(R$_1$)(CH$_2$)$_n$OH listed above can be obtained by reacting the methyl ester derivative of a fluorinated polyether with an amino-alcohol. For example 2-aminoethanol would yield a compound having the moiety —CONHCH$_2$CH$_2$OH. In the same manner, the methyl ester of a fluorinated polyether may be reacted with diethylene triamine or triethylene tetramine to form moieties —CONHCH$_2$CH$_2$NHCH$_2$CH$_2$NH$_2$ and —CONHCH$_2$CH$_2$NHCH$_2$CH$_2$NH—CH$_2$CH$_2$NH$_2$ respectively.

Still further examples of compounds according to above formula (I) are disclosed in EP 870,778 or U.S. Pat. No. 3,536,710.

Component (b) of the composition includes a compound according to the formula (IV)

$$(R')_q M(Y')_{p-q} \quad (IV)$$

wherein R' represents a non-hydrolysable group, M represents an element of valency p+q, preferably selected from the group consisting of Si, Ti, Zr, B, Al, Ge, V, Pb and Sn p is 2, 3 or 4 depending on the valence of M, q is 0, 1 or 2, and Y' represents a hydrolysable group.

The hydrolysable groups present in component (b) may be the same or different and are generally capable of hydrolyzing under appropriate conditions, for example under acidic or basic aqueous conditions, such that component (b) can undergo condensation reactions. Preferably, the hydrolysable groups upon hydrolysis yield groups capable of undergoing condensation reactions, such as hydroxyl groups.

Typical and preferred examples of hydrolysable groups include those as described with respect to Y of component (a). Preferably, component (b) includes tetra-, tri- or dialkoxy (preferably containing 1 to 4 carbon atoms) compounds.

The non-hydrolysable groups R' may be the same or different and are generally not capable of hydrolyzing under the conditions listed above. For example, the non-hydrolysable groups R' may be independently selected from a hydrocarbon group, for example a $C_1$-$C_{30}$ alkyl group, which may be straight chained or branched and may include one or more cyclic hydrocarbon structures, a $C_6$-$C_{30}$ aryl group (optionally substituted by one or more substituents selected from halogens and $C_1$-$C_4$ alkyl groups), or a $C_7$-$C_{30}$ aralkyl group.

In one embodiment the non-hydrolysable groups R' are independently selected from a hydrocarbon group, for example a $C_1$-$C_{30}$ alkyl group and a $C_6$-$C_{20}$ aryl group (optionally substituted by one or more substituents selected from halogens and $C_1$-$C_4$ alkyl groups). In another embodiment the non-hydrolyzable groups R' are independently $C_1$-$C_6$ alkyl groups.

Preferred compounds (b) include those in which M is Ti, Zr, Si and Al. Representative examples of component (b) include tetramethoxysilane, tetra ethoxysilane, methyl triethoxysilane, dimethyldiethoxysilane, octadecyltriethoxysilane, methyl trichlorosilane, tetra-methyl orthotitanate, tetra ethyl orthotitanate, tetra-iso-propyl orthotitanate, tetra-n-propyl orthotitanate, tetraethyl zirconate, tetra-iso-propyl zirconate tetra-n-propyl zirconate and the like. More preferred compounds include $C_1$-$C_4$ alkoxy derivatives of Si, Ti and Zr. Particularly preferred compounds (b) include tetraethoxysilane and methyltriethoxysilane. Single compounds or mixtures of compounds (b) may be used.

Component (c) of the composition includes in one embodiment a compound similar to component (b) and of the formula (V)

R"M(Y")$_{3-x}$ (V)

wherein R" is a $C_3$-$C_{20}$ hydrocarbon group; M is an element as defined above, and preferably is selected from the group consisting of Si, Ti, Zr, B, Al, Ge, V, Pb, Sn and Zn; Y" is a hydrolyzable group and x is 0 or 1. The preferred element M in compound (c) is Si. The hydrolyzable group is the same as that defined above for component (b).

The hydrocarbon group is a $C_3$-$C_{20}$ hydrocarbon group, for example a $C_3$-$C_{30}$ alkyl group, which may be straight chained or branched and may include one or more cyclic hydrocarbon structures, a $C_6$-$C_{30}$ aryl group (optionally substituted by one or more substituents selected from halogens and $C_1$-$C_4$ alkyl groups), or a $C_7$-$C_{30}$ aralkyl group. The preferred hydrocarbon group is a $C_4$-$C_{20}$ alkyl group.

In order to further increase the durability of the coating. Component (c) may be selected from compounds with additional functionality from components (a) and (b). For example, component (c) may include a compound of an element M as defined above, having two or three hydrolyzable groups and at least one reactive functional group per molecule that is capable of engaging in a crosslinking reaction.

The reactive functional group is a group which is capable of engaging in a crosslinking reaction so as to provide further crosslinking functionality to the polycondensation product that can be obtained from components (a), (b) and (c). The crosslinking reaction may involve for example irradiation, heating or a combination thereof. If component (c) includes more than one reactive functional groups, these groups may be the same or different. Of these, free radically polymerizable groups, such as vinyl, acrylate or methacrylate groups, are desired reactive functional groups.

A preferred crosslinking agent can be represented by formula (VI)

L-Q"-M(Y")$_{3-x}$ (VI)

wherein
L represents a reactive functional group that may react by condensation or addition reactions such as an amino group, an epoxy group, a mercaptan or an anhydride group or by free-radical polymerization; and
Y" and M are as described for formula V, and x is 0 or 1. Preferably M is Si and Y is a $C_1$-$C_4$ alkoxy group.

For formula VI, Q" is an alkylene (containing 1 to 10, preferably containing 1 to 6 carbon atoms), an arylene (preferably containing 6 to 20 carbon atoms which may be substituted by one or more $C_1$-$C_4$ alkyl groups, halogen atoms or mixtures thereof), an oxyalkylene group of the formula (—O—R—)$_n$, wherein R is independently selected from a divalent, straight chained or branched lower alkyl group (preferably containing 1 to 6 carbon atoms) and n is an integer from 1 to 20.

Particularly reactive compounds according to formula V, in which the reactive functional group L is one that reacts by addition or condensation reactions, include epoxypropyltrimethoxysilane), bis(3-aminopropyltrimethoxysilyl)amine and aminopropyltrimethoxysilane.

Alternatively L may be a reactive functional group that is a free radical polymerizable group that typically contains an ethylenically unsaturated group capable of undergoing a free radical polymerization. Suitable free radical polymerizable groups L include, for example, moieties derived from vinyl ethers, vinyl esters, allyl esters, vinyl ketones, styrene, vinyl amide, acrylamides, maleates, fumarates, acrylates and methacrylates. Of these, the esters and amides of alpha, beta unsaturated acids, such as the acrylates and methacrylates are preferred.

Where L is a free radical polymerizable group the organic divalent linking group Q" may contain from 1 to about 20, preferably from 1 to 10 carbon atoms. Q" can optionally contain oxygen, nitrogen, or sulfur-containing groups or a combination thereof. Examples of suitable linking groups Q" include straight chain, branched chain or cyclic alkylene (preferably containing 2 to 20 carbon atoms), arylene (preferably containing 6 to 20 carbon atoms), aralkylene (preferably containing 7 to 20 carbon atoms), oxyalkylene, carbonyloxyalkylene, oxycarboxyalkylene, carboxyamidoalkylene, urethanylenealkylene, ureylenealkylene and combinations thereof.

Preferred linking groups Q" for Formula VI are selected from the group consisting of alkylene (preferably containing 2 to 20, more preferably 2 to 10 carbon atoms), oxyalkylene (preferably containing 2 to 20 carbon atoms and 1 to 10 oxygen atoms) and carbonyloxyalkylene (preferably containing 3 to 20 carbon atoms).

Examples of compounds according to formula VI, wherein L is a free radical polymerizable group include vinyltrichlorosilane, vinyltrimethoxysilane, vinyltriethoxysilane and alkoxysilane functionalized acrylates or methacrylates, such as methacryloyloxypropyl trimethoxysilane.

The presence of such reactive functional groups, preferably reactive unsaturated groups in the corresponding polycondensates is advantageous in that following the coating of the composition onto a substrate a two-fold curing can be carried out, i.e. a thermal or photochemically induced linking of the unsaturated organic radicals through radical polymerization and a thermal completion of the polycondensation (e.g. by elimination of water from groups M-OH still present). In the case an unsaturated compound is used, additionally a catalyst should typically be present for the thermal and/or photochemically induced curing of the coating composition applied onto a suitable substrate. Particularly preferred is the addition of a photopolymerization initiator. Such initiators are commercially available and include e.g. Irgacure® 184 (1-hydroxycyclohexyl phenyl ketone), Irgacure® 500 (1-hydroxycyclohexyl phenyl ketone, benzophenone), and other photo-initiators of the Irgacure®-type available from Ciba-Geigy; Darocur®-type photo-initiators, available from Merck, benzophenone and the like.

Examples of optionally employed thermal initiators are known to those skilled in the art and include, among others, organic peroxides in the form of diacyl peroxides, peroxydicarbonates, alkyl peresters, dialkyl peroxides, perketals, ketone peroxides and alkyl hydroperoxides. Specific examples of such thermal initiators are dibenzoyl peroxide, tert-butyl perbenzoate and azobisisobutyronitrile. These initiators are added to the coating composition in amounts known to one skilled in the art. Typically the initiator will be added in an amount between 0.1 and 2% by weight, based on the compounds according to formula IV.

The compositions may further contain additives that provide the coating with additional properties, such as antimicrobial properties. Examples include $[C_{18}H_{37}N\ (CH_3)_2 (CH_2)_3\ Si(OCH_3)_3]^+Cl^-$. However, the addition of ionic non-hydrolysable groups present in the components is preferably kept below about 10% by weight, in order not to adversely affect the water repellency properties of the composition.

The composition of the invention includes three different components and an organic solvent. Typically, component (a) is present in an amount between about 0.1 wt-% and 50 wt-%; component (b) is present in an amount between about 30 wt-% to 99.9 wt-%, and component (c) is present in an amount between about 0 wt-% and 20 wt-%, the wt-% being based on the total weight of the components.

While the benefits of reacting components (a), (b) with (c) extend over a wide range of compositions, good initial repellency is achieved for coatings despite relatively low levels of component (c). Therefore a preferred embodiment of this invention employs the relatively expensive perfluoropolyetherisocyanate silane at 0.5-20 wt-%, giving an economic advantage to the compositions of this invention over other fluorinated coatings. Additionally, compositions of 0.5-20 wt-% component (a) are quite surprisingly more durable in maintaining repellency after abrasion of a coated surface.

In one embodiment, a composition comprising components (a), (b) and (c), sufficient solvent, water, and acid or base catalyst may be combined and coated onto a suitable substrate. When such a coating is applied to the substrate shortly after its preparation, components (a) and (b) and optionally (c) will generally not have undergone a condensation reaction or if condensation has occurred the amount thereof will be low. Generally, the amount of condensation that takes place prior to coating will depend on the concentration and nature of components (a), (b) and (c), the temperature and the time between preparation of the coating composition and the coating of the substrate. Generally, the coating composition will contain components (a), (b) and (c) each in amounts between 0.01% by weight and 5% by weight and the coating is typically applied within about 3 to 8 hours from its preparation. The present invention however does not exclude the possibility of coating a composition in which partial condensates have formed. Typically, compositions comprising partial condensates may form when the aforementioned coating composition is left for some time before coating, for example for more than 1 hour. Nevertheless, the coating composition should be applied to the substrate before the condensation reaction proceeds towards completion.

Preferably, the amount of water will be between 0.1 and 20% by weight of the total composition, more preferably between 0.1 and 10% by weight. In addition to water, an organic or inorganic acid or base catalyst should preferably be used in the coating composition.

Organic acid catalysts include acetic acid, citric acid, formic acid, triflic acid, perfluorobutyric acid and the like. Examples of inorganic acids include sulphuric acid, hydrochloric acid and the like. Examples of useful base catalysts include sodium hydroxide, potassium hydroxide and triethylamine. Organometallic catalysts can also be used. Examples are dibutyltindilaureate and tin di(2-ethylhexanoate). The catalyst will generally be used in amounts between about 0.01 and 10%, more preferably between 0.05 and 5% by weight of the total composition.

The composition of the present invention typically includes one or more organic solvents. The organic solvent or blend of organic solvents used must be capable of dissolving a mixture of compounds (a), (b) and (c) and any partial or complete condensate that may form as a result of partial or complete condensation of (a), (b) and (c). Preferably, the organic solvent or blend of organic solvents used is capable of dissolving at least 0.01% of compounds (a), (b), (c) and/or partial or complete condensates thereof. Furthermore, the solvent or mixture of solvents preferably has a solubility for water of at least 0.1%, preferably 1% by weight and a solubility for the acid or base catalyst of at least 0.01%, preferably 0.1% by weight. If the organic solvent or mixture of organic solvents do not meet these criteria, it may not be possible to obtain a homogeneous mixture of the fluorinated polycondensate, solvent(s), water and catalyst.

Suitable organic solvents, or mixtures of solvents can be selected from aliphatic alcohols (preferably containing 1 to 6 carbon atoms), such as methanol, ethanol, isopropylalcohol; ketones such as acetone or methyl ethyl ketone; esters, such as ethyl acetate, methylformate and ethers, such as diethyl ether. Particularly preferred solvents include ethanol, isopropanol and acetone.

Fluorinated solvents may be used in combination with the organic solvents in order to improve solubility of the starting compounds and/or the partial or complete condensate. Such fluorinated solvents will generally not be suitable for use on their own because they will generally not meet the requirements of solubility for water and acid or base unless they additionally contain hydrophilic groups such as $CF_3CH_2OH$.

Examples of fluorinated solvents include fluorinated hydrocarbons, such as perfluorohexane or perfluorooctane, available from 3M; partially fluorinated hydrocarbons, such as pentafluorobutane, available from Solvay, or $CF_3CFHCFHCF_2CF_3$, available from DuPont; hydrofluoroethers, such as methyl perfluorobutyl ether or ethyl perfluorobutyl ether, available from 3M. Various blends of these materials with organic solvents can be used.

The composition containing the components (a), (b), (c) and/or partial or complete condensates thereof is generally applied to the substrate in amounts sufficient to produce a coating that is water and oil repellent. This coating can be extremely thin, e.g. 1 to 50 molecular layers, though in practice a useful coating may be thicker.

Suitable substrates that can be treated in a particularly effective way with the composition of this invention include substrates having a hard surface that preferably has groups capable of reacting with the components (a), (b), (c) and/or partial or complete condensates. Particularly preferred substrates include ceramics, glass, metal, natural and man-made stone, thermoplastic materials (such as poly(meth)acrylate, polycarbonate, polystyrene, styrene copolymers, such as styrene acrylonitrile copolymers, polyesters, polyethylene terephthalate), paints (such as those on acrylic resins), powder coatings (such as polyurethane or hybrid powder coatings), inox, chromated steel, marmoleum, vinyl and wood. Various articles can be effectively treated with the fluorochemical solution of the present invention to provide a water and oil repellent coating thereon. Examples include ceramic tiles, bathtubs or toilets, glass shower panels, construction glass, various parts of a vehicle (such as the mirror or windscreen), glass, and ceramic or enamel pottery materials.

Treatment of the substrates results in rendering the treated surfaces less retentive of soil and more readily cleanable due to the oil and water repellent nature of the treated surfaces. These desirable properties are maintained despite extended exposure or use and repeated cleanings because of the high degree of durability of the treated surface as can be obtained through the compositions of this invention.

To effect the treatment of a substrate, the composition as disclosed above, is applied to the substrate. The amount of compounds (a), (b), (c) and/or partial or complete condensates to be coated on the substrate will generally be that amount sufficient to produce a coating which is water and oil repellent, such a coating having at 20° C. a contact angle with distilled water of at least 80°, and a contact angle with n-hexadecane of at least 40°, measured after drying and curing of the coating.

Preferably, the substrate should be clean prior to applying the compositions of the invention so as to obtain optimum characteristics, particularly durability. That is, the surface of the substrate to be coated should be substantially free of organic contamination prior to coating. Cleaning techniques depend on the type of substrate and include, for example, a solvent washing step with an organic solvent, such as acetone or ethanol or an aqueous detergent cleaning solution.

The coating composition is typically a relatively diluted solution, containing between 0.01 and 5 percent by weight of components (a), (b), (c) and/or partial or complete condensates, more preferably, between 0.03 and 3 percent by weight, and most preferably, between 0.05 and 2 percent by weight.

In accordance with a preferred embodiment, compositions for application to a substrate are prepared by diluting a concentrate comprising a solution of components (a), (b) and (c) in an organic solvent that is substantially free of water. Dilution of the concentrate may be effected by adding thereto further organic solvent. To the mixture is also added water and optionally an acid or base catalyst to obtain the coating composition. Preferably, the concentrate from which the coating composition is prepared contains components (a), (b) and (c) in their desired weight ratio to each other. In this respect, it has been found that homogeneous concentrates are preferably prepared with compounds (a) that have an alkoxy group of 2 to 4 carbon atoms as the hydrolysable groups on the silyl group. It was found that such compounds more easily allow for the preparation of concentrates in which the weight ratio of compounds (b) to compounds (a) is for example between 1:1 to 99:1, preferably 6:1 to 90:1. High weight ratios may be desired in cases where a high UV stability is desired, i.e. where it is desired that the repellency properties are maintained well when the coating is exposed to UV and humidity. On the other hand, lower weight ratios, for example 1:1 to 6:1 may be desired in case transparency of the coating is critical, such as for example when coating on glass. Component (c) giving additional crosslinking of the coating to the substrate, is typically present in a minor amount, such as 0 to 20% of the total components.

A wide variety of coating methods can be used to apply a composition of the present invention, such as brushing, spraying, dipping, rolling, spreading, and the like. A preferred coating method for application of the coating composition of the present invention includes spray application. An airless spray application will typically be preferred in cases where transparency of the coating is important. A substrate to be coated can typically be contacted with the treating composition at room temperature (typically, about 15° C. to about 30° C.). Alternatively, the mixture can be applied to substrates that are preheated at a temperature of for example between 30° C. and 150° C. This is of particular interest for industrial production, where e.g. ceramic tiles can be treated immediately after the baking oven at the end of the production line. Following application, the treated substrate can be dried and cured at ambient or elevated temperature, e.g. at 40° to 300° C. and for a time sufficient to dry and cure. The coating compositions of the present invention generally do not require subjecting the compositions to an elevated temperature. Thus, repellent and durable coatings in connection with this invention can be readily obtained upon coating and drying at ambient temperature. Alternatively, in addition with a thermal treatment, the coating composition may be cured by irradiation (e.g. by means of UV-irradiators, a laser, etc.) in a manner known per se, depending on the type and presence, respectively of an initiator. The process may also require a polishing step to remove excess material.

The following examples further illustrate the invention without the intention however to limit the invention thereto. All parts are by weight unless indicated otherwise.

| Designator | Name, Structure and/or Formula | Available from |
|---|---|---|
| Al(OC$_4$H$_9$)$_3$ | tributylorthoaluminate | Sigma-Aldrich |
| aminoethanol | NH$_2$CH$_2$CH$_2$OH | Sigma-Aldrich |
| APD | 3-amino-1,2-propanediol; NH2CH$_2$CH(OH)CH$_2$OH | Sigma-Aldrich, Milwaukee, WI |
| APTES | Aminopropyltriethoxysilane NH$_2$(CH2)$_3$Si(OCH$_2$CH$_3$)$_3$ | Sigma-Aldrich |
| DESMODUR ™ N 100 | Polyfunctional isocyanate resin with an average of ~3.5 NCO-groups per molecule | Bayer, Pittsburgh, PA |
| EPSi | epoxy silane; 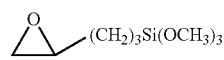 | Sigma-Aldrich |

-continued

| Designator | Name, Structure and/or Formula | Available from |
|---|---|---|
| MTEOS | Methyltriethoxy silane; $CH_3Si(OC_2H_5)_3$ | Sigma-Aldrich |
| NCO-silane | 3-(triethoxysilyl)propyl isocyanate; $OCN(CH_2)_3Si(OC_2H_5)_3$ | Sigma-Aldrich |
| ODSi | Octadecyl trimethoxysilane; $CH_3(CH_2)_{17}Si(OCH_3)_3$ | Sigma-Aldrich |
| TEGME | tri(ethyleneglycol) monomethyl ether; $CH_3(OCH_2CH_2)_3OH$ | Sigma-Aldrich |
| TEOS | Tetraethyl orthosilicate; $Si(OC_2H_5)_4$ | Sigma-Aldrich |
| TEH | tin(II) 2-ethylhexanoate; $[CH_3(CH_2)_3CH(C_2H_5)CO_2]_2Sn$ | Sigma-Aldrich |
| TETA | triethylenetetraamine; $NH_2CH_2CH_2NHCH_2CH_2NHCH_2CH_2NH_2$ | Sigma-Aldrich |
| $Zr(OC_2H_5)_4$ | tetraethylorthozirconate | Sigma-Aldrich |
| HFPO-oligomeric ester | CF3CF2CF2O(CF(CF3)CF2O)xCF(CF3) COOCH3, average MW is 1232 | 3M/Dyneon, St Paul, MN |

Abrasion/Scrub Method

Abrasion testing was accomplished using an Erichsen cleaning machine (available from DCI, Belgium), 3M™ HIGH PERFORMANCE™ Cloth (available from 3M Co., St. Paul, Minn.) and CIF™ cream cleaner (available from Lever Faberge, France), using 40 cycles.

Coating Method

In a first step, the substrates (white sanitary tiles available from Sphinx, Netherlands) were cleaned and degreased with acetone. After cleaning, fluorinated polyether silanes in solvent mixtures as given in the respective examples were applied onto the substrates by spray application at about 20 ml/minute. The substrates were kept at room temperature before coating. Alternatively, the substrates were preheated before coating. Coated samples were dried at room temperature or forced-air oven dried at 120° C. for 30 minutes. Afterwards, excess product was removed using a dry cloth.

Contact Angle Measurement

The treated substrates were tested for their contact angles versus water (W) and n-hexadecane (O) using an Olympus TGHM goniometer (Olympus Corp, Pompano Beach Fla.). The contact angles were measured before (initial) and after abrasion (abrasion), unless otherwise indicated. Contact angles with water and hexadecane were measured at least 24 hrs after application or after abrasion. The values are the mean values of 4 measurements and are reported in degrees. The minimum measurable value for a contact angle was 20. A value <20 means that the liquid spreads on the surface.

Preparation 1: HFPO/Succinyl Fluoride Oligomeric Ester (HFPO-SF)

Can be prepared essentially according to U.S. Pat. No. 4,647,413, Examples 1 and 9.

Preparation 2: HFPO-Oligomeric Ester/APD/NCO-Silane; 1/1/2

A three-necked 100 mL round bottom flask fitted with a stirrer, heating mantle, thermometer and condenser, was charged with HFPO-oligomeric diester (12.3 g; 0.01 mole) and APD (0.9 g; 0.01 mole). Reaction was carried out under nitrogen. The temperature of the mixture was elevated to 40° C. and held for 16 hrs. NCO-silane (5.0 g; 0.02 mole) was then added along with one drop of TEH (about 0.05 g) and the resulting mixture was heated overnight at 80° C. The reaction was checked for residual isocyanate using standard IR techniques. A viscous liquid was obtained, and this viscous liquid was diluted to 50% solids in ethylacetate.

Preparation 3: HFPO-Oligomeric Ester/TETA/NCO-Silane; 1/1/3

A three necked 100 mL round bottom flask fitted with a stirrer, heating mantle, thermometer and condenser, was charged with HFPO oligomeric ester (12.3 g; 0.01 mole) and TETA (1.5 g; 0.01 mole). Reaction was carried out under nitrogen. The temperature of the mixture was elevated to 40° C. and held for 4 hrs. NCO-silane (7.4 g; 0.03 mole) was then added and the resulting mixture was heated overnight at 40° C. The reaction was checked for residual isocyanate using standard IR techniques. A viscous liquid was obtained, and this viscous liquid diluted to 50% solids in ethyl acetate.

Preparation 4 HFPO-Oligomeric Ester/APD/NCO-Silane=1/1/2 Condensate with TEOS

A three-necked 100 mL flask fitted with a stirrer, condenser and thermometer was charged with TEOS (18.0 g.), 20 g ethanol, HFPO-oligomeric ester/APD/NCO-silane; 1/1/2 (4.0 g.; 50% in ethyl acetate) as made in preparation 2, water (1.0) g.), and HCl (1.0 g.; 37% aqueous). The ensuing mixture was stirred for 16 hours at room temperature, resulting in a slightly hazy solution.

Preparation 5: HFPO-SF/APD/NOC-Silane; 1/2/4

The procedure described in Preparation 2 was followed replacing HFPO-oligomeric ester with and equimolar amount of HFPO-SF diester as described in Preparation 1 and appropriate amounts of other materials to achieve the 1/2/4 molar ratio.

Preparation 6: HFPO-Oligomeric Ester/APD/NCO-Silane/TEGME; 1/1/2/6; Alkoxy Exchange with TEGME The procedure described in Preparation 2 was followed with the exception that after checking for residual isocyanate, TEGME (0.06 mol; 9.9 g) was added to the reaction mixture, a Dean-Stark trap was set up and the mixture was heated for 2 hours at 120° C. and 3 hrs at 140° C. A clear, slightly brown liquid was obtained, and diluted to 50% by weight in ethyl acetate.

Preparation 7: HFPO-Oligomeric Ester/TETA/NCO-Silane/TEGME; 111/3/9; Alkoxy Exchange with TEGME The procedure described in Preparation 3 was followed with the exception that after checking for residual isocyanate, TEGME (0.09 mol; 14.8 g) was added to the reaction mixture, a Dean-Stark trap was set up and the mixture was heated for 2 hours at 120° C. and 3 hrs at 140° C. A clear, slightly brown liquid was obtained, and diluted to 50% by weight in ethyl acetate.

Preparation 8: HFPO-oligomeric Ester/Aminoethanol/DESMODUR™ N-100/APTES; 1/1/1/2

A three necked 100 ml flask, equipped with a stirrer, condenser and thermometer was charged with HFPO-oligomeric ester (12.3 g; 0.01 mol) and aminoethanol (0.7 g; 0.01 mole). The mixture was reacted for 4 hrs at 60° C. under nitrogen; then DESMODUR™ N-100 (3.3 g; 0.01 mole), ethylacetate (30 g) and one drop of TEH (about 0.05 g). The mixture was heated at 80° C. overnight under nitrogen. The ensuing mixture was cooled to 40° C. and APTES (3.5 g; 0.02 mole) was added and further reacted for 4 hrs at 40° C. Reaction was checked for residual isocyanate. A viscous liquid was obtained.

EXAMPLES 1-8

The formulations of Table 1 were prepared according to the procedure described in preparation 4. All ingredients were mixed in the appropriate ratios, as described in table 1, in ethanol and in the presence of water and acid and then condensed. The obtained reaction mixtures were diluted to 0.1% fluorochemical solids in ethanol and applied using the above described coating method.

TABLE 1

Formulations of Condensate Examples

| Ex | Additive #1 | Additive #2 | Additive # 3 | Weight Ratio of #1:#2:#3 |
|---|---|---|---|---|
| 1 | Preparation 2 | TEOS | — | 1:1:0 |
| 2 | Preparation 2 | TEOS | — | 1:9:0 |
| 3 | Preparation 2 | TEOS/MTEOS | — | 1:4.5/4.5:0 |
| 4 | Preparation 2 | TEOS | APTES | 1:8.5:0.5 |
| 5 | Preparation 6 | TEOS | — | 1:9:0 |
| 6 | Preparation 5 | TEOS | — | 1:9:0 |
| 7 | Preparation 3 | TEOS | — | 1:9:0 |
| 8 | Preparation 7 | TEOS | — | 1:9:0 |

EXAMPLE 9

The formulations in Table 2 were prepared by mixing additives just prior to using the coating method above described.

EXAMPLES 10 TO 19 AND C2 AND C2

Following the procedure of example 9, further examples were prepared using the ingredients and weights as mentioned in Table 2. Application on tiles was done according to example 9.

COMPARATIVE EXAMPLE C1

Same procedure as in example 9, but using example FES-2 from U.S. Pat. No. 6,649,272.

COMPARATIVE EXAMPLE C2

Same procedure as in example 9, but using example 50 from WO 002/3848.

TABLE 2

Examples 9-19
Additives mixed just prior to application resulting in partial condensates

| Ex | Additive #1 | Additive #2 | Additive #3 | Additive #4 | Weight in grams present in 100 g ethanol #1:#2:#3:#4 |
|---|---|---|---|---|---|
| 9 | Prep 2 | TEOS | | HCl-- | 0.2:0..6:0:0.1 |
| 10 | Prep 2 | TEOS/MTEOS | | HCl | 0.2:0.3/0.3:0::0.1 |
| 11 | Prep 2 | Zr(OC$_2$H$_5$)$_4$ | | HCl | 0.2:0.6:0:0.1 |
| 12 | Prep 2 | Al(OC$_4$H$_9$)$_3$ | | HCl— | 0.2:0.6:0:0.1 |
| 13 | Prep 2 | TEOS | EPSi | HCl | 0.2:0.6:0.05:0.1 |
| 14 | Prep 2 | TEOS | ODSi | HCl | 0.2:0.6:0.05:0.1 |
| 15 | Prep 2 | TEOS | | Water/Acetic acid | 0.2:0.6:0:3.0/1.5 |
| 16 | Prep 3 | TEOS | | HCl | 0.2:0.6:0:0.1 |
| 17 | Prep 5 | TEOS | | HCl | 0.2:0.6:0:0.1 |
| 18 | Prep 5 | TEOS/MTEOS | | HCl | 0.2:0.3/0.:3:0:0.1 |
| 19 | Prep 8 | TEOS | | HCl | 0.2:0.6:0:0.1 |

TABLE 3

Results of contact angle (°) measurements for Examples 1-19 and Comparative Example C1 & C2

| | Contact angles water/hexadecane (°) | | | |
|---|---|---|---|---|
| Example | Initial | After abrasion test | 16 hrs 18% HCl | 16 hrs 3% NaOH |
| 1 | 106/68 | 85/55 | 92/62 | 90/5 |
| 2 | 108/63 | 88/50 | 90/58 | 90/52 |
| 3 | 115/63 | 85/53 | 95/60 | 88/55 |
| 4 | 102/65 | 82/50 | 90/61 | 85/50 |
| 5 | 108/70 | 85/52 | 90/63 | 86/53 |
| 6 | 107/72 | 90/56 | 92/60 | 88/55 |
| 7 | 105/66 | 85/54 | 90/58 | 83/50 |
| 8 | 104/62 | 83/52 | 92/58 | 85/52 |
| 9 | 107/72 | 83/53 | 90/59 | 88/55 |
| 10 | 112/65 | 85/52 | 88/60 | 85/54 |
| 11 | 105/64 | 82/50 | 85/56 | 83/50 |
| 12 | 109/67 | 85/54 | 85/57 | 88/51 |
| 13 | 105/52 | 83/51 | 83/58 | 80/48 |
| 14 | 110/61 | 87/50 | 87/60 | 89/53 |
| 15 | 105/65 | 82/48 | 85/60 | 82/50 |
| 16 | 103/63 | 82/53 | 88/60 | 85/54 |
| 17 | 105/73 | 88/57 | 92/61 | 90/60 |
| 18 | 108/70 | 87/55 | 90/63 | 88/61 |
| 19 | 105/62 | 82/50 | 82/57 | 86/53 |
| C1 | 95/55 | 60/25 | 80/47 | 75/43 |
| C2 | 106/66 | 90/59 | 92/60 | 60/35 |

The contact angles listed in Table 3 indicate compositions of the invention give high water and oil repellencies. Furthermore they provide high mechanical abrasion resistance and particularly good chemical resistance to acid and alkali.

The invention claimed is:

1. A composition comprising a mixture of:
   (a) a hydrolyzable perfluoropolyether urethane or urea silane or a mixture thereof comprising the reaction product of:
   (i) a fluorinated polyether compound of the formula $$(T')_y\text{-}R_f\text{-}T \qquad (I)$$

wherein $R_f$ is a monovalent or divalent polyfluoropolyether group; T and T' each independently represents —CO$_2$R$^3$, where R$^3$ is hydroxyalkyl, or —C(O)N(R$^1$)(R$^2$), where R$^1$ is hydroxyalkyl, dihydroxypropyl, or polyalkylenepolyamine and R$^2$ is hydrogen or R$^1$; and y is 0 or 1; and (ii) a silane compound of the formula $$T''\text{-}Q''\text{-}SiY_{3-x}R_x \quad (II)$$

wherein T'' is —NCO; Q'' is —$(C_nH_{2n})$—, where n is 2 to 6; R is an alkyl group of 1-4 carbon atoms; Y is a hydrolyzable group; and x is 0, 1 or 2;

(b) at least one non-fluorinated compound of the formula:

$$(R')_q Si(Y')_p$$

wherein R' is a $C_1$-$C_4$ alkyl group; p is 2, 3 or 4; q is 0, 1 or 2, wherein the sum of p+q is 4, and Y' is a $C_1$-$C_4$ alkoxy group; and (c) optionally, at least one non-fluorinated compound of the formula:

$$R''Si(Y'')_3$$

wherein R'' is a $C_6$-$C_{20}$ alkyl group and Y'' is a $C_1$-$C_4$ alkoxy group, or a compound of the formula:

$$L\text{-}Q''\text{-}Si(Y'')_3,$$

wherein L is a reactive functional group selected from an amino, an epoxy, a mercaptan, a methacrylate and an anhydride group; Q'' is —$(C_nH_{2n})$—, where n is 2 to 6; Y'' is a $C_1$-$C_4$ alkoxy group.

2. The composition according to claim 1, wherein T and T' each independently represent —C(O)N($R^1$)($R^2$), where $R^1$ is hydroxyalkyl, dihydroxypropyl, or polyalkylenepolyamine, and $R^2$ is hydrogen.

3. The composition according to claim 1, wherein $R^1$ is hydroxyalkyl, dihydroxypropyl, or polyalkylenepolyamine, and $R^2$ is hydrogen.

4. The composition according to claim 1, wherein $R^1$ is hydroxyalkyl or polyalkylenepolyamine and $R^2$ is hydrogen or $R^1$, or wherein $R^1$ is dihydroxypropyl and $R^2$ is hydrogen.

5. A composition according to claim 1, further comprising an organic solvent.

6. A composition according to claim 5, wherein said organic solvent comprises a solvent capable of dissolving between 0.01% and 5.00% by weight of component (a).

7. A composition according to claim 5, wherein said organic solvent is an alcohol, ketone, ether or ester.

8. A composition according to claim 1, wherein $R_f$ in Formula (I) is of the formula:

$$-((R_f^3)_{q'}-R_f^2-O)_{z'}-R_f^1-(O-R_f^2-(R_f^3)_q)_z \quad (III)$$

wherein $R_f^1$ is a perfluorinated alkyl or a perfluorinated alkylene group, $R_f^2$ is a perfluorinated polyalkyleneoxy group consisting of perfluorinated alkyleneoxy groups having 1, 2, 3 or 4 carbon atoms or a mixture of such perfluorinated alkyleneoxy groups; $R_f^7$ is a perfluorinated alkylene group or a substituted perfluorinated alkyl group; q and q' are independently chosen from 0 or 1; z is from 4 to 30, and z' is 0 to 30.

9. A composition according to claim 8, wherein $R_f^2$ comprises repeating units selected from the group consisting of —$(C_nF_{2n}O)$—, —$(CF(Z)O)$—, —$(C_nF_{2n}CF(Z)O)$—, and —$(CF_2CF(Z)O)$—, and combinations thereof, wherein n is at least 1 and wherein Z is a fluorine atom, a perfluoroalkyl group, a substituted perfluoroalkyl group, an oxygen-substituted perfluoroalkyl group, a perfluoroalkoxy group, or an oxygen-substituted perfluoroalkoxy group.

10. A composition according to claim 8, wherein $R_f^3$ comprises repeating units selected from the group consisting of —$(C_nF_{2n})$— and —$(CF(Z))$—, and combinations thereof, wherein n is at least 1 and wherein Z is a fluorine atom, a perfluoroalkyl group, a substituted perfluoroalkyl group, an oxygen-substituted perfluoroalkyl group, a perfluoroalkoxy group, or an oxygen-substituted perfluoroalkoxy group.

11. A composition according to claim 1, wherein $R_f$ is —$CF_2O(CF_2O)_m(C_2F_4O)_pCF_2$—, —$CF_2O(C_2F_4O)_pCF_2$—, —$CF(CF_3)(OCF_2(CF_3)CF)_pO(CF_2)_mO(CF(CF_3)CF_2O)_pCF(CF_3)$—, or combinations thereof, where an average value for m and p is 0 to 50 and m and p are not each independently 0.

12. A composition according to claim 1 wherein $R_f$ is $CF_3CF_2O(CF_2O)_m$—$(C_2F_4O)_pCF_2$—, $CF_3CF_2CF_2O(CF(CF_3)CF_2O)_pCF(CF_3)$—, $CF_3CF_2O(C_2F_4O)_pCF_2$—, $CF_3CF(CF_3)O$—$(CF(CF_3)CF_2O)_pCF(CF_3)$—, or combinations thereof, where an average value for m and p is 0 to 50 and m and p are not each independently 0.

13. A composition according to claim 1, wherein component (a) is present in an amount of between 1 wt-% and 50 wt-%; component (b) is present in an amount between 50 wt-% and 99 wt-%; and component (c) is present in an amount between 0 wt-% and 20 wt-%, the weight-% being based on the total weight of the components.

14. The composition according to claim 1, herein said composition is derived from a partial condensation reaction of components (a), (b) and (c).

15. The composition according to claim 1, wherein said composition is derived from a complete condensation reaction of components (a), (b) and (c).

16. A process for preparing a partial or complete condensate comprising reacting components (a), (b) and (c) according to claim 1 in a polar organic solvent in the presence of water and an acid or base catalyst.

17. A method of treating a substrate comprising applying to at least part of a surface of said substrate a composition according to claim 1.

18. A treated substrate as prepared by the method according to claim 17.

* * * * *